(12) United States Patent
Yu

(10) Patent No.: US 11,415,839 B2
(45) Date of Patent: Aug. 16, 2022

(54) COLOR FILTER SUBSTRATE AND METHOD OF MANUFACTURING SAME AND LIQUID CRYSTAL DISPLAY DEVICE

(71) Applicant: TCL China Star Optoelectronics Technology Co., Ltd., Guangdong (CN)

(72) Inventor: Yun Yu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/615,550

(22) PCT Filed: Oct. 29, 2019

(86) PCT No.: PCT/CN2019/114096
§ 371 (c)(1),
(2) Date: Nov. 21, 2019

(87) PCT Pub. No.: WO2021/003897
PCT Pub. Date: Jan. 14, 2021

(65) Prior Publication Data
US 2021/0096419 A1    Apr. 1, 2021

(51) Int. Cl.
*G02F 1/1339* (2006.01)
*G02F 1/1335* (2006.01)

(52) U.S. Cl.
CPC ........ *G02F 1/13396* (2021.01); *G02F 1/1339* (2013.01); *G02F 1/133512* (2013.01); *G02F 1/133516* (2013.01)

(58) Field of Classification Search
None
See application file for complete search history.

(56) References Cited

U.S. PATENT DOCUMENTS

| | | | | |
|---|---|---|---|---|
| 2007/0026324 | A1* | 2/2007 | Yoshida | C23C 14/0036 430/7 |
| 2009/0046239 | A1* | 2/2009 | Watanabe | G02F 1/13394 349/157 |
| 2010/0128207 | A1 | 5/2010 | Hwang | |
| 2013/0250227 | A1* | 9/2013 | Kira | G02F 1/1339 349/153 |
| 2016/0131941 | A1* | 5/2016 | Chen | G02F 1/136209 349/43 |
| 2017/0299918 | A1* | 10/2017 | Yu | G02F 1/133512 |

(Continued)

FOREIGN PATENT DOCUMENTS

| | | | |
|---|---|---|---|
| CN | 103969883 A | * | 8/2014 |
| CN | 103969883 A | | 8/2014 |

(Continued)

*Primary Examiner* — Shan Liu
(74) *Attorney, Agent, or Firm* — The Roy Gross Law Firm, LLC; Roy Gross

(57) ABSTRACT

A color filter substrate and a method of manufacturing the same and a liquid crystal display device are disclosed. A display area is provided with a first spacer, and a non-display area is provided with a second spacer. The non-display area is further provided with a virtual color resist layer. Color of the virtual color resist layer is the same as color of the third color resist layer, and a height of the first spacer is greater than a height of the second spacer.

8 Claims, 4 Drawing Sheets

(56) References Cited

U.S. PATENT DOCUMENTS

| | | | | |
|---|---|---|---|---|
| 2018/0275458 A1* | 9/2018 | Lin | .................. | G02F 1/1333 |
| 2018/0321536 A1* | 11/2018 | Hu | .................. | G02F 1/133514 |
| 2021/0333593 A1* | 10/2021 | Huang | .............. | G02F 1/133514 |

FOREIGN PATENT DOCUMENTS

| | | | |
|---|---|---|---|
| CN | 104317096 | A | 1/2015 |
| CN | 104730756 | A | 6/2015 |
| CN | 104865735 | A | 8/2015 |
| CN | 106200095 | A | 12/2016 |
| CN | 106444131 | A | 2/2017 |
| CN | 106526955 | A | 3/2017 |
| CN | 106802509 | A | 6/2017 |
| CN | 107942579 | A | 4/2018 |
| CN | 107991804 | A | 5/2018 |
| CN | 109557709 | A | 4/2019 |
| CN | 110376785 | A | 10/2019 |
| JP | 2005031420 | A | 2/2005 |
| KR | 20080003108 | A | 1/2008 |
| KR | 100846980 | B1 | 7/2008 |
| KR | 20160091497 | A | 8/2016 |

\* cited by examiner

COLOR FILTER SUBSTRATE AND METHOD OF MANUFACTURING SAME AND LIQUID CRYSTAL DISPLAY DEVICE

FIELD OF INVENTION

The present invention relates to the display technical field, and in particular, to a color filter substrate and a method of manufacturing the same and a liquid crystal display device.

BACKGROUND OF INVENTION

With rapid development of liquid crystal displays, the manufacturing requirements for display quality of panels are getting higher and higher. Production of high-quality and mura free panels has become the ultimate pursuit for panel manufacturers. Due to differences in the design of the periphery of panels, uneven display occurs at the peripheral area of the display panels. That is, mura appears at the peripheral area. One of the most common reasons for the appearance of the mura at the peripheral area is that the film thickness between the non-display area at the peripheral area and the display area is inconsistent, causing cell gap thickness differences.

FIG. 1 is a schematic view 100 showing a common structure of a display panel in the prior art, including a display area 11, a non-display area 12, a red color resist layer 111 disposed at the display area 11, a green color resist layer 112, a blue color resist layer 113, a spacer 114, and a spacer 121 disposed at the non-display area 12. During a coating process, since the display area 11 is provided with a color resist layer while the non-display region 12 is not provided with a color resist layer, and moreover total amount of coating liquid is constant, when the spacer is deposited, a height of the spacer 114 at the display area 11 is much different from a height of the spacer 121 at the non-display area 12, thereby causing a thickness of the cell gap at the edge of the display area 11 in contact with the non-display area 12 is lower. Thus, uneven display occurs at the peripheral area of the display area 11 when the display panel displays.

Therefore, in the conventional color filter substrate and the method of manufacturing the same, there is still a problem that a height of a spacer at the display area and a height of a spacer at the non-display area of the color filter substrate are different, resulting in a uneven display occurring in the display area of the liquid crystal panel due to the different film thicknesses of the liquid crystal panel, which is in urgent need of improvement.

SUMMARY OF INVENTION

The present invention relates to a color filter substrate, a method of manufacturing the same and a liquid crystal display device for solving the problem that a uneven display occurs in the display area of the liquid crystal panel due to the different film thicknesses of the liquid crystal panel resulting from the different height between the spacer at the display area and the spacer at the non-display area of the liquid crystal panel.

In order to solve the aforementioned problem, the technical solution provided by the present application is as follows.

A color filter substrate provided by the present application comprises a display area and a non-display area, wherein the display area is provided with a substrate, a plurality of black matrices, a plurality of color resist layers of different colors, and a first spacer; wherein the non-display area is provided with the substrate, the plurality of black matrices, a virtual color resist layer and a second spacer; wherein color of the virtual color resist layer is the same as color of one of the color resist layers, material of the first spacer is the same as material of the second spacer, and a height of the first spacer is greater than or equal to a height of the second spacer.

In one embodiment of the present application, the color resist layer is divided into a first color resist layer, a second color resist layer, and a third color resist layer.

In one embodiment of the present application, the color of the virtual color resist layer is the same as color of the third color resist layer.

In one embodiment of the present application, a height of the first color resist layer is equal to a height of the second color resist layer and a height of the third color resist layer, and greater than a height of the virtual color resist layer.

In one embodiment of the present application, a difference between the height of the color resist layer and the height of the virtual color resist layer is less than or equal to 0.1 um.

In one embodiment of the present application, an orthographic projection area of the first spacer on the substrate is equal to an orthographic projection area of the second spacer on the substrate.

In one embodiment of the present application, the height of the first spacer is greater than the height of the second spacer, and the height of the second spacer is greater than the height of the first color resist layer, the second color resist layer, or the third resist layer.

In one embodiment of the present application, a difference between the height of the first spacer and the height of the second spacer is less than 0.1 um.

In one embodiment of the present application, shapes of the spacers and the color resist layer are rectangular parallelepipeds, cubes, cylinders, or circular truncated cones.

In one embodiment of the present application, the black matrices on the substrate are spaced apart from each other.

In one embodiment of the present application, the black matrices are disposed on the same side of the first color resist layer, the second color resist layer, or the third color resist layer.

In one embodiment of the present application, the spacer is disposed on a side of the black matrices facing away from the substrate.

The present application further provides a method of manufacturing a color filter substrate, wherein the color filter substrate comprises a display area and a non-display area, the method of manufacturing the color filter substrate comprising steps of: S10: providing a substrate; S20: forming a plurality of black matrices at the display area of the substrate; S30: sequentially forming a first color resist layer and a second color resist layer at the display area of the substrate, forming a mask pattern on a mask, and performing pre-bake, exposure, and development; S40: forming a third color resist layer at the display area of the substrate, and forming a virtual color resist at the non-display area, so that the third color resist layer covering the display area and the non-display area, and after finishing the pre-bake, exposing and developing the third color resist layer at the display area and the non-display area; and S50: coating spacer material on a whole layer at a side of the substrate provided with the color resist layer, and performing pre-bake, exposure, and development, so that both of the display area and the non-display area being provided with spacers.

In one embodiment of the present application, a method of manufacturing the black matrices in the step S20 comprises steps of: S201: providing black photoresist material;

S202: coating the substrate with the black photoresist material; S203: exposing and developing the black photoresist material by using a photomask, so that the black matrices dividing the substrate into a plurality of sub-pixel regions spaced apart from each other.

In one embodiment of the present application, the mask is divided into a first mask and a second mask.

In one embodiment of the present application, the present application further provides a liquid crystal display device, comprising a color filter substrate and an array substrate disposed facing the color filter substrate, a liquid crystal layer disposed between the array substrate and the color filter substrate, and a backlight module adjacent to a side of the array substrate, consisting of the color filter substrate, the liquid crystal layer, and the array substrate; wherein the color filter substrate comprises a display area and a non-display area; wherein the display area is provided with a substrate, a plurality of black matrices, a plurality of color resist layers of different colors, and a first spacer; wherein the non-display area is provided with a substrate, a plurality of black matrices, a virtual color resist layer and a second spacer; wherein color of the virtual color resist layer is the same as color of one of the color resist layers, and material of the first spacer is the same as material of the second spacer, and a height of the first spacer is greater than or equal to a height of the second spacer.

In one embodiment of the present application, the color resist layer is divided into a first color resist layer, a second color resist layer, and a third color resist layer.

In one embodiment of the present application, the color of the virtual color resist layer is the same as color of the third color resist layer.

In one embodiment of the present application, a height of the first color resist layer is equal to a height of the second color resist layer and a height of the third color resist layer, and greater than a height of the virtual color resist layer.

In one embodiment of the present application, a difference between the height of the color resist layer and the height of the virtual color resist layer is less than or equal to 0.1 um.

The present invention has the following beneficial effects.

In the process of manufacturing the color filter substrate, the virtual color resist layer disposed at the non-display area occupies a part of the non-display area in such a manner that the height of the second spacer at the non-display area is equal to the height of the first spacer at the display area in the case where total amount of solution of each spacers is the same to ensure that the film thickness of the display area is identical with the non-display area have the same film thickness, thereby reducing the occurrence of display unevenness.

The production of the virtual color resist layer is performed together with the production of the last color resist layer at the display area, so that the height of the virtual color resist layer can be manufactured slightly lower than the color resist layer at the display region within a reasonable range, thereby operability at the non-display area is improved and the process thereof is simple.

BRIEF DESCRIPTION OF THE DRAWINGS

To describe the technical solutions of the embodiments or the prior art more clearly, the following outlines briefly the accompanying drawings for describing the embodiments of the present invention or the prior art. Apparently, the accompanying drawings described below are merely about some embodiments of the present invention, and persons of ordinary skill in the art can derive other drawings from the accompanying drawings without any creative effort.

DETAILED DESCRIPTION OF EMBODIMENTS

The technical solutions of the embodiments of the present application are described clearly and completely in the following with reference to the accompanying drawings in the embodiments of the present application. Apparently, the described embodiments are merely a part rather than all of the embodiments of the present application. All other embodiments obtained by a person of ordinary skill in the art based on the embodiments of the present disclosure without creative efforts shall fall within the protection scope of the present disclosure.

In the description of the present application, it is to be understood that terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure. Moreover, terms such as "first" and "second" are used herein for purposes of description and are not intended to indicate or imply relative importance or significance or to imply the number of indicated technical features. Therefore, the features defined by the terms "first" and "second" may explicitly or implicitly include one or more of these features. In addition, in the description of the present disclosure, "a plurality of" means two or more than two, unless specified otherwise.

Specifically refer to FIGS. 2 to 5, the present application provides a color filter substrate, a method of manufacturing the same, and a liquid crystal display device.

Figure 1:
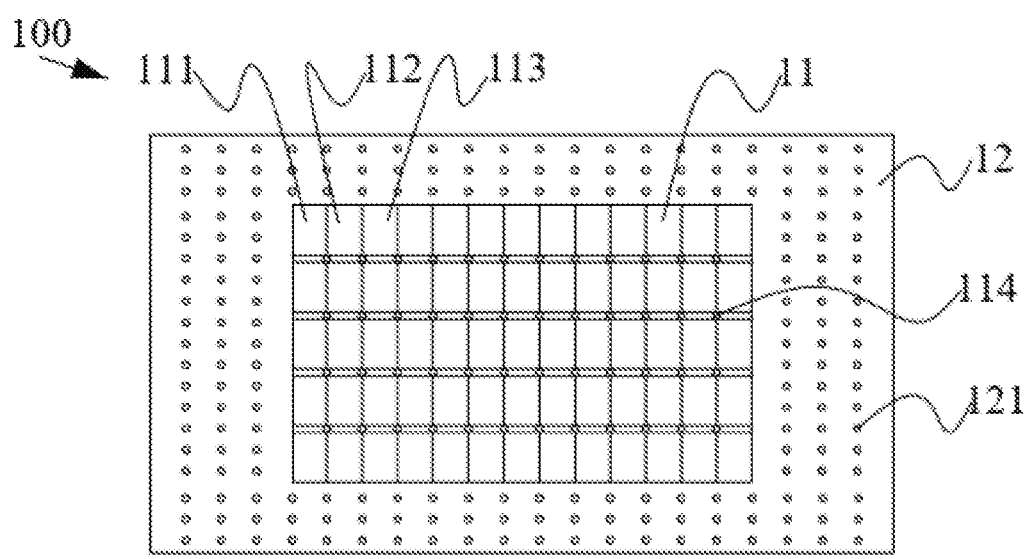
FIG. 1 is a schematic view showing structure of the color filter substrate in the prior art.
Figure 2:
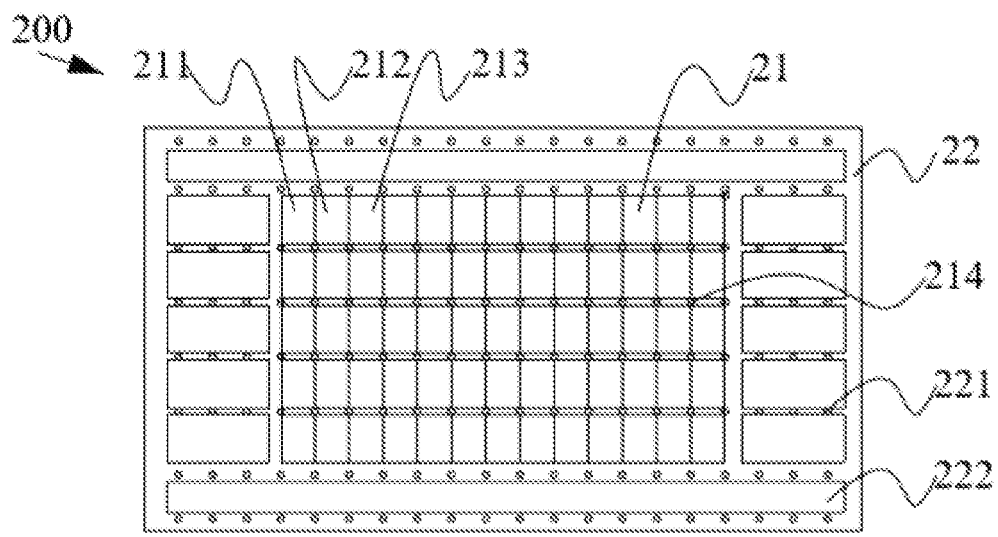
FIG. 2 is a schematic view showing the first structure of a color filter substrate provided by the embodiment of the present invention.

Refer to FIG. 2, which is a schematic view 200 showing a first structure of a color filter substrate provided by an embodiment of the present application, including a display area 21 and a non-display area 22. The display area 21 is provided with a first color resist layer 211, a second color resist layer 212, a third color resist layer 213, and a first spacer 214. The non-display area 22 is provided with a second spacer 221 and a virtual color resist layer 222.

Figure 3:
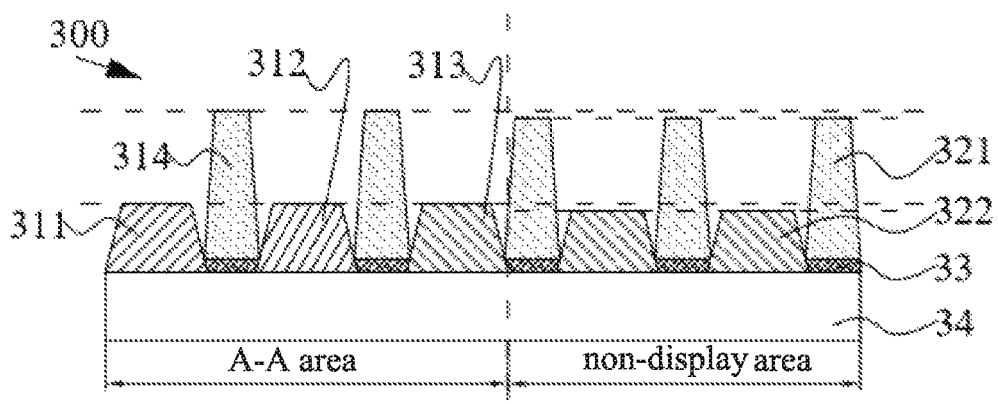
FIG. 3 is a schematic view showing the second structure of a color filter substrate provided by the embodiment of the present invention.

Refer to FIG. 3, which is a schematic view 300 showing a second structure of a color filter substrate provided by an embodiment of the present application. The substrate 34 is divided into a display area and a non-display area. A plurality of black matrices 33 are spaced apart from each other on the substrate 34. A first color resist layer 311, a second color resist layer 312, a third color resist layer 313 and a virtual color resist layer 322 are further provided on the side of the substrate 34 on which the black matrices 33 are disposed. A first spacer 314 and a second spacer 321 are further disposed on a side of the black matrices 33 facing away from the substrate 34. The first color resist layer 311, the second color resist layer 312, the third color resist layer 313 and the first spacer 314 are disposed at the display area, and the virtual color resist layer 322 and the second spacer 321 are disposed at the non-display area. Shapes of the spacers and the color resist layer may be rectangular parallelepipeds, cubes, cylinders, or circular truncated cones, and are not limited to the illustration shown in the drawings of the present application.

Color of the virtual color resist layer 322 is the same as color of the third color resist layer 313. A height of the first color resist layer 311 is equal to a height of the second color resist layer 312 and a height of the third color resist layer 313, and greater than a height of the virtual color resist layer 322 at the non-display area.

The first spacer 314 is disposed at the display area, and the second spacer 321 is disposed at the non-display area. The height of the first spacer 314 is greater than the height of the second spacer 321. The height of the second spacer 321 is greater than the height of the first color resist layer 311, the second color resist layer 312, or the third color resist layer 313 at the display area. An orthographic projection area of the first spacer 314 on the substrate is equal to an orthographic projection area of the second spacer 321 on the substrate. A difference between the height of the color resist layer at the display area and the height of the virtual color resist layer at the non-display area is less than or equal to 0.1 um.

In the coating process, the total amount of solution of the spacer is constant with or without the virtual color resist layer provided at the non-display area. In the circumstance where the virtual color resist layer is not provided at the non-display area, space in the non-display area is greater than space in the display area, and a height of deposition of the solution of the spacer with the same amount is lower. After the virtual color resist layer is disposed at the non-display area, the space in the non-display area is the same as the space in the display area. When the spacer is deposited at the non-display area, the height of the second spacer may be equal to the height of the first spacer.

In an embodiment of the present application, a distance between two of the color resist layers connected to each other at the display area is equal to a distance between two of the virtual color resist layers 322 connected to each other at the non-display area. Any two of the color resistances, e.g. a distance between red resistance and green resistance, green resistance and blue resistance, and blue resistance and red resistance are the same. Moreover, the width of the color resist layer at the display area is equal to the width of the virtual color resist layer 322 at the non-display area.

In another embodiment of the present application, a distance between two of the color resist layers connected to each other at the display area is greater than a distance between two of the virtual color resist layers 322 connected to each other at the non-display area, wherein a distance between any two of the color resist layers connected to each other is equal to a distance between another two of the color resist layers connected to each other at the display area, and a distance between any two of the virtual color resist layers 322 connected to each other is the same as a distance between another two of the virtual color resist layers 322 connected to each other at the non-display area. Moreover, in order to ensure that the height difference obtained by the height of the first spacer 314 minus the height of the second spacer 321 is less than or equal to 0.1 um, the width of the virtual color resist layer 322 at the non-display area should be configured to be less than or equal to the width of the color resist layer at the display area.

In another embodiment of the present application, a distance between two of the color resist layers connected to each other at the display area is less than a distance between two of the virtual color resist layers 322 connected to each other at the non-display area. Similarly, a distance between any two of the color resist layers connected to each other is equal to a distance between another two of the color resist layers connected to each other at the display area, and a distance between any two of the virtual color resist layers 322 connected to each other is the same as a distance between another two of the virtual color resist layers 322 connected to each other at the non-display area. Similarly, in order to ensure that the height difference obtained by the height of the first spacer 314 minus the height of the second spacer 321 is less than or equal to 0.1 um, the width of the virtual color resist layer 322 at the non-display area should be configured to be more than or equal to the width of the color resist layer at the display area.

Figure 4:
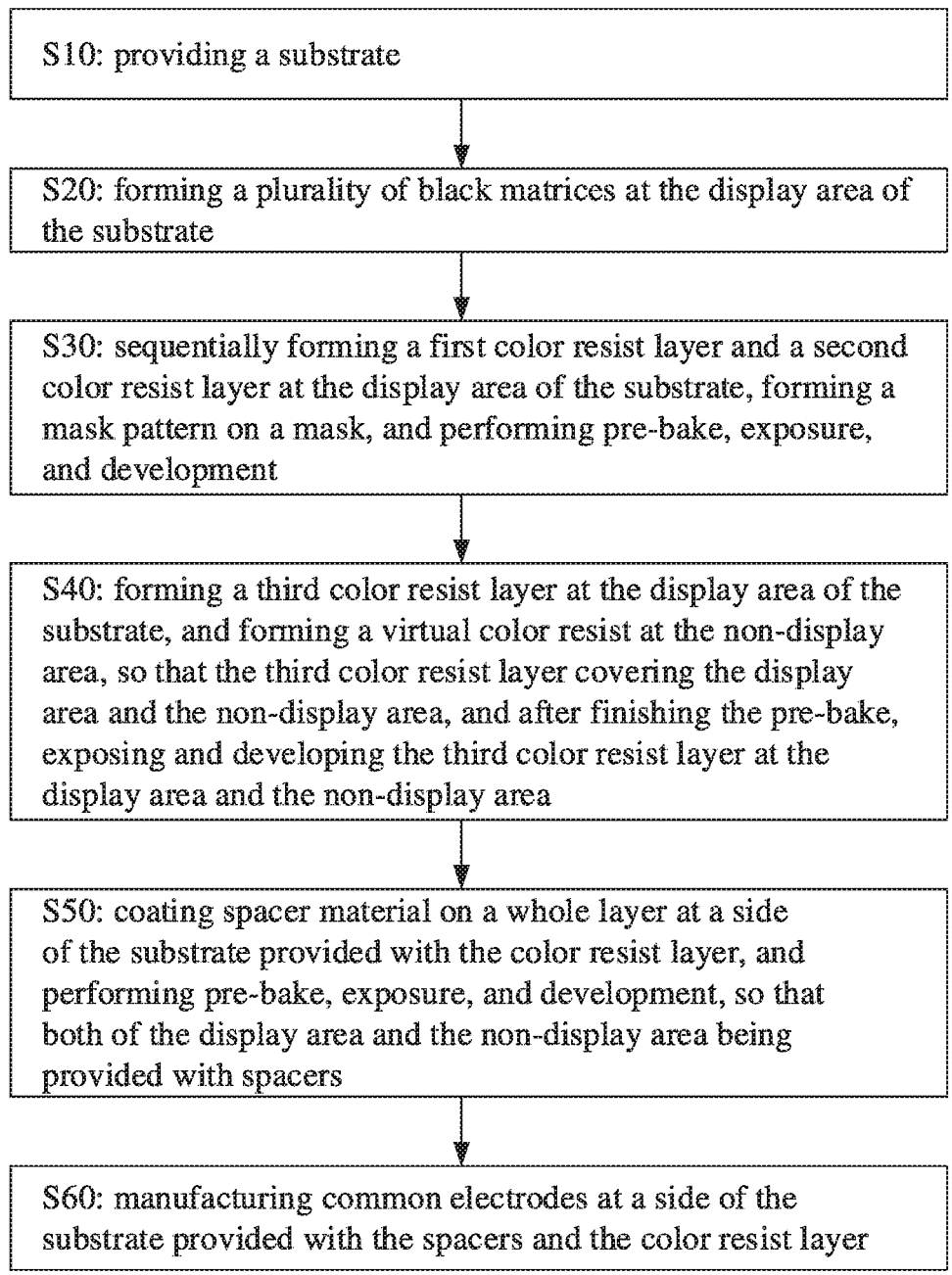
FIG. 4 is a schematic flowchart of a method of manufacturing a color filter substrate provided by the embodiment of the present invention.

Refer to FIG. 4, which is a schematic flowchart of a method of manufacturing a color filter substrate provided by an embodiment of the present invention. The color filter substrate includes a display area and a non-display area. The method includes the following steps: S10: providing a substrate; S20: forming a plurality of black matrices at the display area of the substrate; S30: sequentially forming a first color resist layer and a second color resist layer at the display area of the substrate, forming a mask pattern on a mask, and performing pre-bake, exposure, and development; S40: forming a third color resist layer at the display area of the substrate, and forming a virtual color resist at the non-display area, so that the third color resist layer covering the display area and the non-display area, and after finishing the pre-bake, exposing and developing the third color resist layer at the display area and the non-display area; S50: coating spacer material on a whole layer at a side of the substrate provided with the color resist layer, and performing pre-bake, exposure, and development, so that both of the display area and the non-display area being provided with spacers; and S60: manufacturing common electrodes at a side of the substrate provided with the spacers and the color resist layer.

Further, a method of manufacturing the black matrices in the step S20 comprises steps of S201: providing black photoresist material; S202: coating the substrate with the black photoresist material; and S203: exposing and developing the black photoresist material by using a photomask, so that the black matrices dividing the substrate into a plurality of sub-pixel regions spaced apart from each other.

Figure 5:
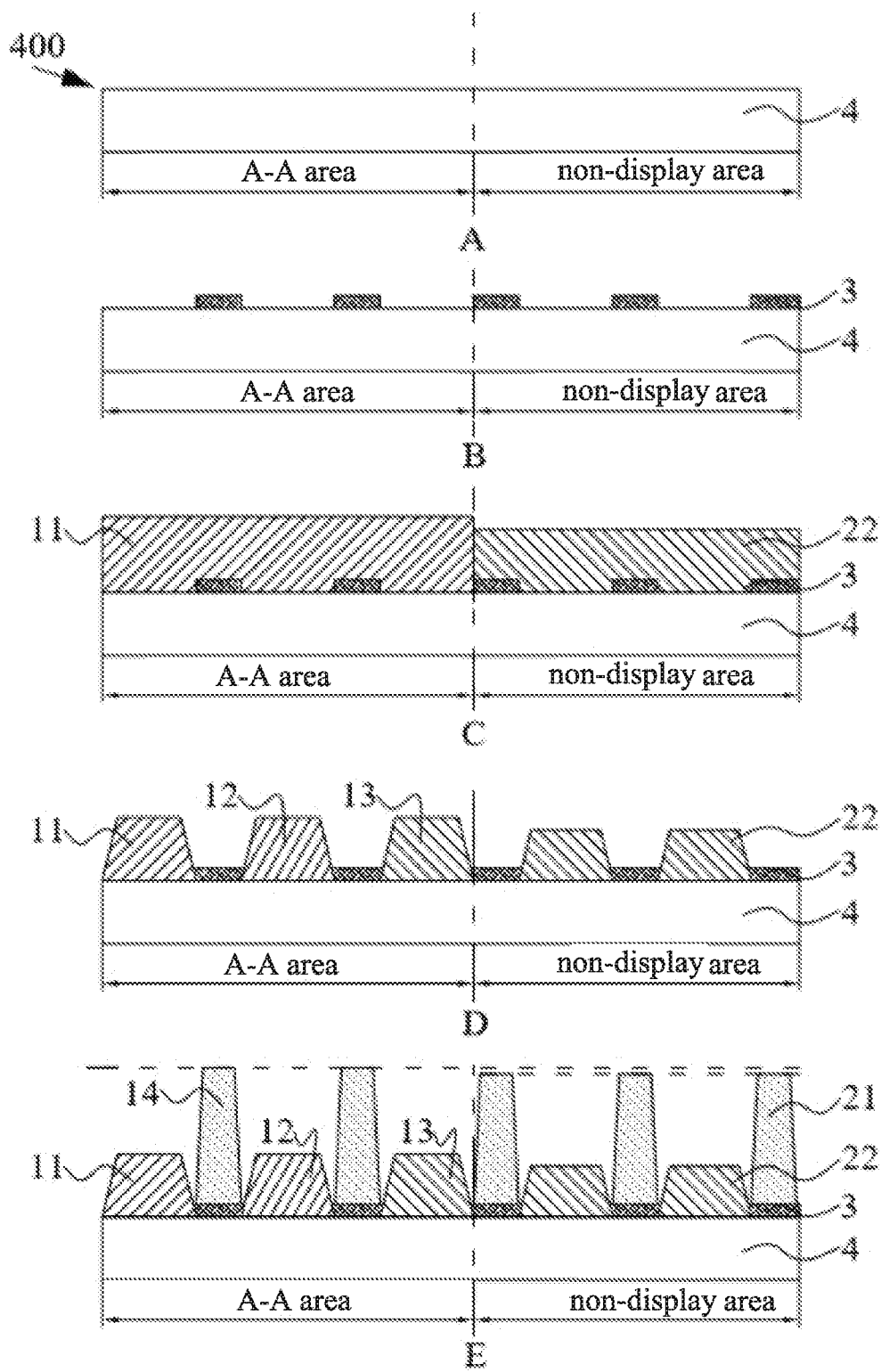
FIG. 5 is a flowchart of a method of manufacturing a color filter substrate provided by the embodiment of the present invention.

Refer to FIG. 5, which is a flowchart 400 of a method of manufacturing a color filter substrate provided by the embodiment of the present invention. First, a substrate 4 is provided. The substrate 4 is divided into a display area (i.e., AA area) and a non-display area, refer to the symbol A shown in FIG. 5. Then, a whole black matrix layer is coated on the substrate 4, and then exposure, development, etc. are conducted to form a plurality of the black matrices 3 spaced apart from each other, as shown in FIG. 5. Further, a first color resist layer is coated in the display area, and is pre-baked, exposed, and developed to form a single first color resist layer 11 unit; and then a single second color resist layer 12 unit and a single third color resist layer 13 unit are sequentially manufactured, when the third color resist layer 13 unit is manufactured, not only the display area but also the non-display region are coated, and a virtual color resist layer 22 is manufactured, wherein the color of the virtual color resist layer 22 is the same as the color of the third color resist layer 13, refer to the symbols C and D shown in FIG. 5. Finally, the entire layer at a side of the black matrix 3 facing away from the substrate 4 is coated with spacer material, and then pre-baked, exposed and developed to form the spacer 14 at the display area, and form the pacer 21 at the non-display area, refer to the symbol E shown in FIG. 5.

The present application provides a liquid crystal display device which includes a color filter substrate, an array substrate disposed facing the color filter substrate, a liquid crystal layer disposed between the array substrate and the color filter substrate, and a backlight module adjacent to a side of the array substrate, consisting of the color filter substrate, the liquid crystal layer, and the array substrate. The color filter substrate comprises a display area and a non-display area. The display area is provided with a substrate, a plurality of black matrices, a plurality of color resist layers of different colors, and a first spacer. The non-display area is provided with a substrate, a plurality of black matrices, a virtual color resist layer and a second spacer. Color of the virtual color resist layer is the same as color of one of the color resist layers, and material of the first spacer is the same as material of the second spacer, and a height of the first spacer is greater than or equal to a height of the second spacer.

A color filter substrate, a method of manufacturing the same and a liquid crystal display device provided by the embodiments of the present application are described in detail above. The principles and implementations of the present application are described by using specific examples herein. The description of the above examples only helps to understand the method and the core idea of the present application. Persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A color filter substrate, comprising: a display area and a non-display area, wherein the display area is provided with a substrate, a plurality of black matrices, a plurality of color resist layers of different colors, and a first spacer;
    wherein the non-display area is provided with the substrate, the plurality of black matrices, a virtual color resist layer, and a second spacer;
    wherein color of the virtual color resist layer is same as color of one of the color resist layers, material of the first spacer is same as material of the second spacer, and a height of the first spacer from a surface of the substrate is greater than a height of the second spacer from the surface of the substrate;
    wherein the color resist layer is divided into a first color resist layer, a second color resist layer, and a third color resist layer;
    wherein the color of the virtual color resist layer is same as color of the third color resist layer;
    wherein a height of the first color resist layer from the surface of the substrate is equal to a height of the second color resist layer from the surface of the substrate and a height of the third color resist layer from the surface of the substrate, and greater than a height of the virtual color resist layer from the surface of the substrate,
    wherein a difference between the height of the first, second or third color resist layer and the height of the virtual color resist layer is less than or equal to 0.1 um, and
    wherein a difference between the height of the first spacer and the height of the second spacer is less than 0.1 um.

2. The color filter substrate of claim 1, wherein an orthographic projection area of the first spacer on the substrate is equal to an orthographic projection area of the second spacer on the substrate.

3. The color filter substrate of claim 2, wherein the height of the second spacer is greater than the height of the first color resist layer, the second color resist layer, or the third resist layer.

4. The color filter substrate of claim 1, wherein shapes of the spacers and the color resist layer are rectangular parallelepipeds, cubes, cylinders, or circular truncated cones.

5. The color filter substrate of claim 1, wherein the black matrices on the substrate are spaced apart from each other.

6. The color filter substrate of claim 5, wherein the black matrices are disposed on the same side of the first color resist layer, the second color resist layer, or the third color resist layer.

7. The color filter substrate of claim 6, wherein the first spacer and the second spacer are disposed on a side of the black matrices facing away from the substrate.

8. A liquid crystal display device, comprising: a color filter substrate and an array substrate disposed facing the color filter substrate, a liquid crystal layer disposed between the array substrate and the color filter substrate, and a backlight module adjacent to a side of the array substrate of a liquid crystal display panel consisting of the color filter substrate, the liquid crystal layer, and the array substrate;
    wherein the color filter substrate comprises a display area and a non-display area;
    wherein the display area is provided with a substrate, a plurality of black matrices, a plurality of color resist layers of different colors, and a first spacer;
    wherein the non-display area is provided with a substrate, a plurality of black matrices, a virtual color resist layer and a second spacer;
    wherein color of the virtual color resist layer is the same as color of one of the color resist layers, and material of the first spacer is the same as material of the second spacer, and a height of the first spacer from a surface of the substrate is greater than a height of the second spacer from the surface of the substrate;
    wherein the color resist layer is divided into a first color resist layer, a second color resist layer, and a third color resist layer;
    wherein the color of the virtual color resist layer is the same as color of the third color resist layer;
    wherein a height of the first color resist layer from the surface of the substrate is equal to a height of the second color resist layer from the surface of the substrate and a height of the third color resist layer from the surface of the substrate, and greater than a height of the virtual color resist layer from the surface of the substrate,
    wherein a difference between the height of the first, second or third color resist layer and the height of the virtual color resist layer is less than or equal to 0.1 um, and wherein a difference between the height of the first spacer and the height of the second spacer is less than 0.1 um.

* * * * *